UNITED STATES PATENT OFFICE.

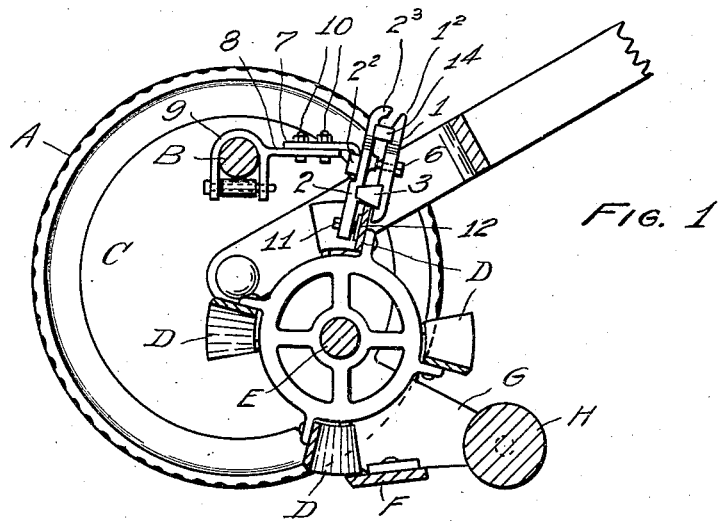

CHUNE D. LICHTENSTEIN, OF SEATTLE, WASHINGTON.

SHARPENER FOR LAWN-MOWERS.

1,070,900.  Specification of Letters Patent.   Patented Aug. 19, 1913.

Application filed February 19, 1913. Serial No. 749,316.

*To all whom it may concern:*

Be it known that I, CHUNE D. LICHTENSTEIN, a subject of the Czar of Russia, residing at Seattle, in the county of King and State of Washington, have invented certain new and useful Improvements in Sharpeners for Lawn-Mowers, of which the following is a specification.

This invention relates to sharpeners for lawn mowers, and its object is the provision of an inexpensive device of this character whereby the mower knives may be quickly and efficiently sharpened.

The invention consists in the novel construction and combination of parts, as will be hereinafter described and claimed.

In the accompanying drawings, Figure 1 is a longitudinal vertical section of a lawn-mower with an implement embodying the present invention applied thereto and shown in side elevation. Fig. 2 is a side elevation of the file-holding head shown detached. Fig. 3 is a front elevation of Fig. 2. Fig. 4 is a horizontal section taken substantially through 4—4 of Figs. 2 and 3.

Referring to the drawings, A represents one of the rollers of a mower; B the stationary rod or bar which rigidly connects the gear cases C; D the spiral cutter blades which are carried by a driven shaft E, and F is a stationary straight knife having its ends secured in the frame members G which are provided with bearings for the axle of the usual roller H.

According to the present invention a head comprising a pair of jaws 1 and 2 are employed to clamp a file 3 therebetween and at a distance from the lips $1^1$ and $2^1$ of the opening at the bottom of the head. The file is of a trapezoidal shape and fits into correspondingly shaped recesses 4 and 5 provided in the jaws, as shown, to afford an inclined lower face $3^1$.

6 represents the screws used for securing the jaws together. At the rear of jaw 2 is a socket $2^2$ to receive the turned down end of a member 7 of a two-part arm, the other member 8 thereof being provided with a loop 9 which hooks over the frame rod B. Said arm is adjustable as to length by the provision of slots therein to receive coupling bolts 10. The function of the extensible arm is to adapt the device for use on various sizes of mowers so that the blades thereof will enter the said opening between the jaws 1 and 2. Attached to the jaw 2 by screws 11 is a presser plate 12, helical springs 13 are used to yieldingly press a blade D against the lip $1^1$ of the jaw 1. The screws 11 are adjustably secured to the presser plate and pass through the respective springs and holes provided in jaw 2. The jaws, file and plate are curved longitudinally to correspond to the curvature of the blades D.

In operation, to sharpen the blades D, the mower is supported so that the rollers A and blades D turn free, then the device is moved from end to end with a blade interposed between the presser plate 12 and jaw 1. In such operation a partial turning movement about the axis of shaft E is produced in the blades to accommodate the distance at which the jaws are set with respect to the loop 9 which is guided by rod B.

Included in the invention is a file 14 which is employed for sharpening the knife F. The file 14 is straight and is clamped between the head jaws in proximity to its top and is desirably seated in recesses provided in the jaws, as shown. At the top, the inner face of the jaw lip $1^2$ is chamfered at 15 and the other lip $2^3$ is curved, as at 16, and terminates with a face 17 which is substantially parallel with the chamfer 15 of the other jaw.

In operating the device for sharpening the knife F, the head is withdrawn from the arm member 7 and by inserting the cutting edge of the knife (indicated by broken lines $x$ in Fig. 2) between the jaws and juxtaposed against file 14, the knife can be readily sharpened by reciprocating the head through an endwise movement with respect to the knife.

What I claim, is—

1. A lawn-mower sharpener, comprising a head having two jaws, a file clamped between said jaws, a spring pressed presser plate carried by one of said jaws and serving to yieldingly hold a mower knife against the other jaw, and an adjustable connection to said head and arranged to make a sliding engagement with the transverse rod provided on a lawn-mower.

2. A lawn-mower sharpener having a head comprising two jaws, a file seated in recesses provided in the opposing faces of the respective jaws, screws for clamping said jaws to the file, a presser plate positioned between said jaws in proximity to the file, screws secured to said plate and extending through holes provided in one of the jaws, and springs interposed between the last named jaw and said plate whereby the latter is yieldingly pressed toward the other jaw.

Signed at Seattle, Wash., this 11th day of February, 1913.

CHUNE D. LICHTENSTEIN.

Witnesses:
PIERRE BARNES,
E. PETERSON.

Copies of this patent may be obtained for five cents each, by addressing the "Commissioner of Patents, Washington, D. C."